US011062285B2

(12) United States Patent
Marcelle et al.

(10) Patent No.: US 11,062,285 B2
(45) Date of Patent: Jul. 13, 2021

(54) SERVICE KIOSK

(71) Applicants: GO MOTO, INC., Philadelphia, PA (US); MERIDIAN ZERO, LLC, Aberdeen, NC (US)

(72) Inventors: Todd Marcelle, Arlington, VA (US); Christopher Gilder, Southern Pines, NC (US); Robert Florig, Philadelphia, PA (US); Lynwood A. Williams, Jr., Clayton, NC (US); Philip Aubrey White, Clayton, NC (US)

(73) Assignees: GO MOTO, INC., Philadelphia, PA (US); MERIDIAN ZERO, LLC, Aberdeen, NC (US)

( * ) Notice: Subject to any disclaimer, the term of this patent is extended or adjusted under 35 U.S.C. 154(b) by 573 days.

(21) Appl. No.: 15/451,060

(22) Filed: Mar. 6, 2017

(65) Prior Publication Data
US 2018/0165655 A1    Jun. 14, 2018

Related U.S. Application Data

(60) Provisional application No. 62/432,138, filed on Dec. 9, 2016.

(51) Int. Cl.
G06Q 20/18    (2012.01)
G06K 7/14     (2006.01)
G07F 17/00    (2006.01)

(52) U.S. Cl.
CPC ........... *G06Q 20/18* (2013.01); *G06K 7/1417* (2013.01); *G07F 17/0014* (2013.01)

(58) Field of Classification Search
None
See application file for complete search history.

(56) References Cited

U.S. PATENT DOCUMENTS 4,514,623 A * 4/1985 Baus .................. G06K 7/084
                                              235/449
4,753,387 A * 6/1988 Fee ................... G07D 11/0096
                                              232/43.3

(Continued)

OTHER PUBLICATIONS

A. Luse and A.M. Townsend. Improving direction-giving through utilization of an RFID enabled kiosk. 2008 IEEE International Conference on Electro/Information Technology (pp. 250-253). (Year: 2008).*

(Continued)

*Primary Examiner* — Stephanie Z Delich
(74) *Attorney, Agent, or Firm* — Locklar PLLC

(57) ABSTRACT

Systems, methods and tools for securely scheduling appointments, maintenance and repairs of vehicles. The system may be an automated service kiosk available 24 hours a day. A customer can schedule services, drop off and pick up keys for receiving service at any time that may be convenient for the customer, without regard for the normal operating hours of the service provider and may do so without having to interact with an employee of the service provider. Automated customer recognition may be performed using license scanning or biometric scanning. The user may select a service from a menu of services and deposit keys (or key fobs) within the kiosk system or receive keys therefrom. Upon returning to complete the service transaction customers may scan a paper or digital receipt provided during the initial scheduling of the service and tender payment via the kiosk or using digital currency.

10 Claims, 11 Drawing Sheets

(56) References Cited

U.S. PATENT DOCUMENTS

| | | | |
|---|---|---|---|
| 6,041,310 A | 3/2000 | Green et al. | |
| 6,543,683 B2* | 4/2003 | Hoffman | G06Q 20/0453 |
| | | | 235/375 |
| 7,668,747 B2 | 2/2010 | Murphy et al. | |
| 2005/0131745 A1* | 6/2005 | Keller | G06Q 10/04 |
| | | | 705/7.15 |
| 2007/0023512 A1* | 2/2007 | Miller | G06Q 10/087 |
| | | | 235/385 |
| 2007/0226088 A1* | 9/2007 | Miles | G06Q 10/08 |
| | | | 705/28 |
| 2008/0065601 A1 | 3/2008 | Korbonski | |
| 2010/0088192 A1* | 4/2010 | Bowles | G06Q 30/0237 |
| | | | 705/26.1 |
| 2010/0155471 A1* | 6/2010 | Heinz | G07C 9/00103 |
| | | | 235/381 |
| 2010/0223106 A1 | 9/2010 | Hallowell et al. | |
| 2010/0235179 A1* | 9/2010 | Kienle | G06Q 10/087 |
| | | | 705/2 |
| 2011/0073642 A1 | 3/2011 | Yablonowski | |
| 2011/0191203 A1 | 8/2011 | Hughes et al. | |
| 2012/0092190 A1* | 4/2012 | Stefik | G06Q 10/02 |
| | | | 340/932.2 |
| 2012/0095790 A1* | 4/2012 | Stefik | G06Q 10/02 |
| | | | 705/5 |
| 2012/0208450 A1 | 8/2012 | Sparks | |
| 2012/0296777 A1 | 11/2012 | Fugman et al. | |
| 2012/0310410 A1* | 12/2012 | Adams | E05G 1/04 |
| | | | 700/237 |
| 2013/0080290 A1 | 3/2013 | Kamm | |
| 2013/0085874 A1* | 4/2013 | Gagne | G07F 17/42 |
| | | | 705/17 |
| 2016/0140649 A1* | 5/2016 | Kleve | G06Q 30/0645 |
| | | | 705/307 |

OTHER PUBLICATIONS

Bernhard, Matthew and Halderman, J. Alex. Implementing Attestable Kiosks. Dec. 12, 2016 14th Annual Conference on Privacy, Security and Trust (PST) (pp. 722-729) (Year: 2016).*

Amir Negametzyanov, Sian Lun Lau, Chin Fei Ng. Web-based Interactive Form Generator for public Kiosks. 2015 IEEE Conference on Open Systems (ICOS) (pp. 108-113) (Year: 2015).*

* cited by examiner

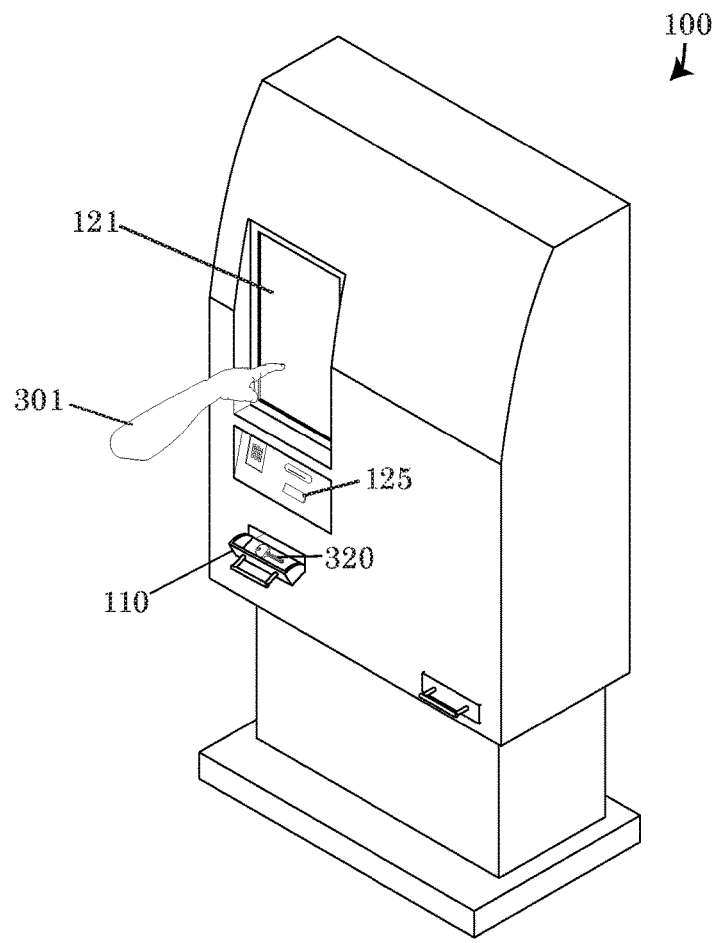
FIG 3a
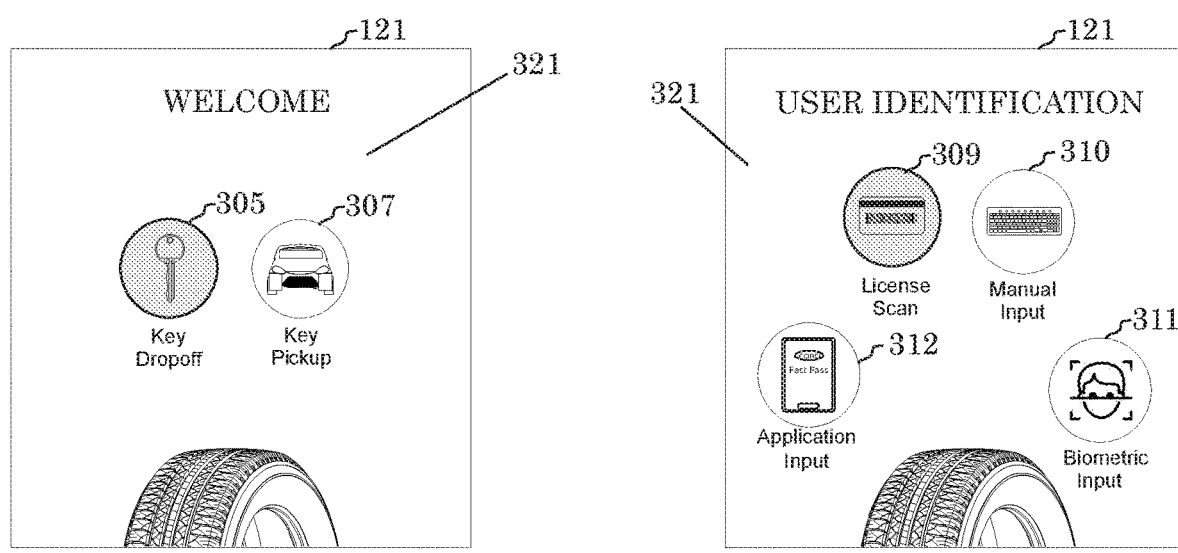
FIG 3b
FIG 3c

FIG 5a

VEHICLE INFORMATION

| Year | 2010 |
| Make | Ford |
| Model | F150 |
| Trim | Extended Cab |
| Mileage | 85508 |

Next

FIG 5b

CREATE A 4-DIGIT PIN

| Number | **** |
| Confirm | **** |

Next

FIG 5c

PLEASE SELECT SERVICES

Next

FIG 5d

SERVICE REQUEST DETAILS

- Oil and filter change
- Replace brakes and pads
- Check engine diagnostics

Next

FIG 5e

DROP KEY NOW

Next

FIG 5f

KEY SECURED

Finalize   Re-send

SERVICE KIOSK

CROSS REFERENCE TO RELATED APPLICATIONS

This application claims the priority and benefit of U.S. Patent Application No. 62/432,138 filed Dec. 9, 2016, entitled "SERVICE KIOSK", the content of which is incorporated herein by reference.

FIELD OF THE TECHNOLOGY

The present disclosure relates generally to systems and methods for scheduling, performing and securing payment for services.

BACKGROUND

Traditional methods and systems for dealing with a service related business typically revolve around interacting with the employees providing the service during the company's business hours. Service models utilizing face to face interactions can be especially inconvenient when vehicles are simply required to be dropped off or picked up by the customer in order for the vehicle to be repaired, returned, or exchanged. The interaction with a service provider's employee can be tedious and result in the customer having to be inconvenienced by the company's specific operating hours. Customer may possibly have to wait to be helped, or suffer through an extended waiting period while another repair is being completed, because a knowledgeable enough employee is not immediately available.

SUMMARY

A first embodiment of this disclosure relates generally to computer system comprising a processor; a memory device coupled to the processor; a scanning device in electronic communication with the processor; a key storage system in electronic communication with the processor, comprising a deposit zone and a retrieval zone; and a computer readable storage device coupled to the processor, wherein the storage device contains program code executable by the processor via the memory device to implement a method for performing a service comprising the steps of: receiving, by the processor, user input identifying a user profile; displaying, by the processor, a plurality of services available for each vehicle registered to the user profile; scheduling, by the processor, a selected service; assigning, by the processor, a storage location for a key deposited into the deposit zone of the key storage system; and providing, by the processor, a scannable code, wherein the scannable code identifies the storage location of the key and instructs the computer system to retrieve the key as a function of scanning the scannable code with the scanning device.

A second embodiment of this disclosure relates generally to method for performing a service comprising the steps of: receiving, by a processor, user input identifying a user profile; displaying, by the processor, a plurality of services available for each vehicle registered to the user profile; scheduling, by the processor, a selected service; assigning, by the processor, a storage location for a key deposited into a deposit zone of a key storage system; and providing, by the processor, a scannable code, wherein the scannable code identifies the storage location of the key and instructs the processor to retrieve the key as a function of scanning the scannable code with a scanning device.

A third embodiment of this disclosure relates generally to computer program product comprising: a computer readable hardware storage system having computer readable program code stored therein, said program code containing instructions executable by a computer processor to implement a method for performing a service comprising the steps of: receiving, by the processor, user input identifying a user profile; displaying, by the processor, a plurality of services available for each vehicle registered to the user profile; scheduling, by the processor, a selected service; assigning, by the processor, a storage location for a key deposited into a deposit zone of a key storage system; and providing, by the processor, a scannable code, wherein the scannable code identifies the storage location of the key and instructs the processor to retrieve the key as a function of scanning the scannable code with a scanning device.

BRIEF DESCRIPTION OF THE DRAWINGS

Some of the embodiments will be described in detail, with reference to the following figures, wherein like designations denote like members, wherein:

FIG. 3a depicts an embodiment of a user identifying themselves to a kiosk system and performing a key drop-off.

FIG. 3b depicts an embodiment of a kiosk system interface selecting a key drop-off.

FIG. 3c depicts an embodiment of a kiosk system interface selecting user identification via a license scan.

FIG. 5a depicts an embodiment of a kiosk system interface presenting user vehicle information.

FIG. 5b depicts an embodiment of a kiosk system interface creating a secure pin to access service information.

FIG. 5c depicts an embodiment of a kiosk system interface presenting a plurality of automotive services.

FIG. 5d depicts an embodiment of a kiosk system interface detailing the automotive services selected in FIG. 5c.

FIG. 5e depicts an embodiment of a kiosk system interface instruction a user to provide a key to a kiosk drop off zone.

FIG. 5f depicts an embodiment of a kiosk system generating a scannable code as a function of completing a service order with the kiosk and/or depositing keys within a deposit zone of the kiosk.

DETAILED DESCRIPTION OF THE DISCLOSURE

Figure 1:
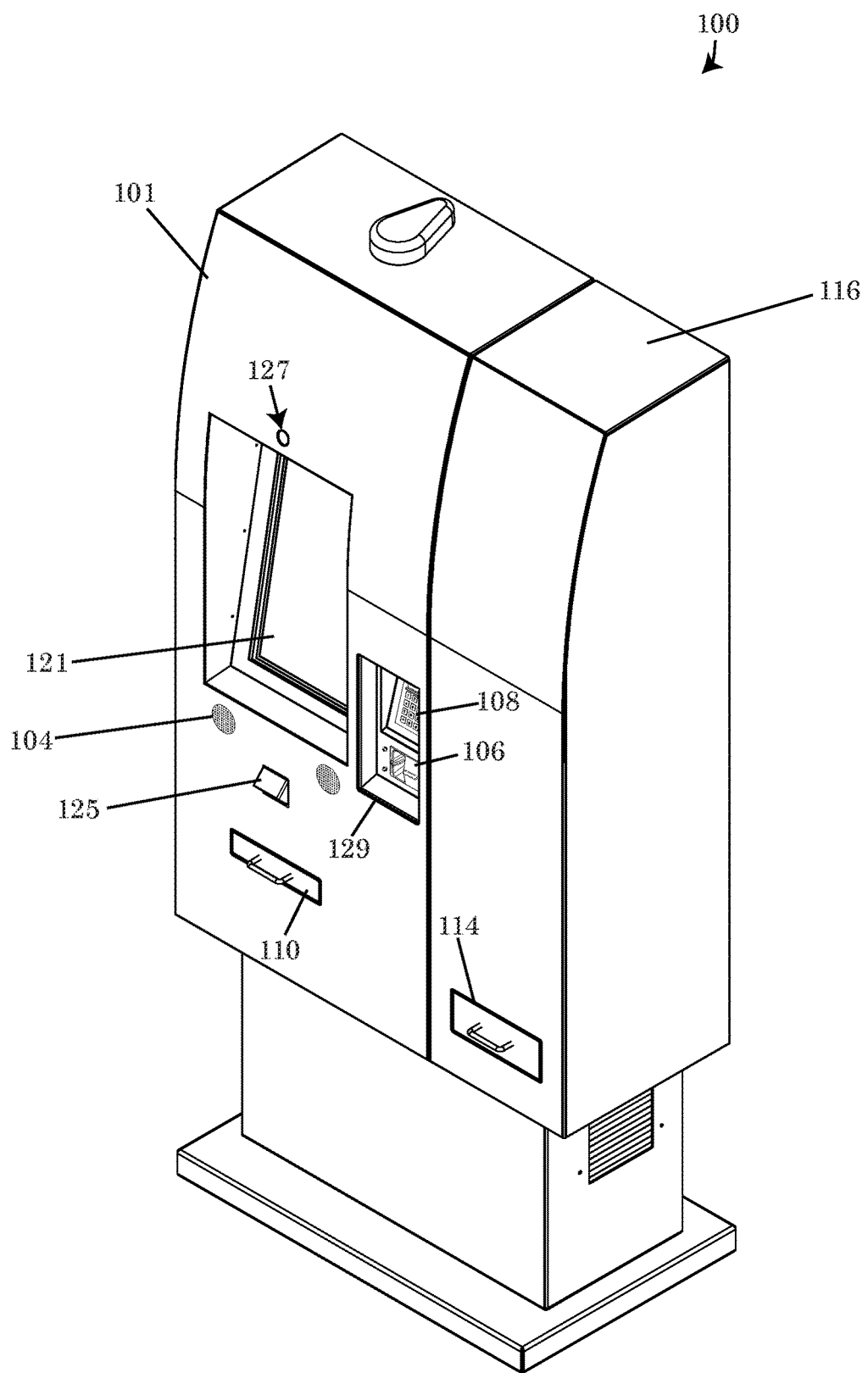
FIG. 1 depicts an exterior isometric view of an embodiment of a kiosk system.

A detailed description of the hereinafter described embodiments of the disclosed apparatus and method are presented herein by way of exemplification and not limitation with reference to the Figures. Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure.

As a preface to the detailed description, it should be noted that, as used in this specification and the appended claims, the singular forms "a", "an" and "the" include plural referents, unless the context clearly dictates otherwise.

Overview

Procuring services, such as repair and maintenance services, can be restrictive due to the limited number of hours an automotive dealership or repair shop is open for business. Most often, automotive services are scheduled and performed during the daytime and typically while vehicle owners are often scheduled to work. Finding time to schedule automotive services and bring the vehicle to the dealership or repair shop can be limiting or interfere with a customer's normal daily routine. While some service providers offer the option to drop off a vehicle and provide the keys after business hours using a key drop box or key slot to deliver the vehicle for service, the method can still be limiting. Typically, a customer must call ahead of time to schedule an appointment and discuss the issues with the vehicle before dropping off the vehicle. Thus, if an emergency repair or service is required after hours, the customer must still wait to schedule the appointment for the service during the next time the business is open. Moreover, payment and pickup of the vehicle are further limited to being performed during regularly scheduled hours as well when an employee is available to process the payment.

Embodiments of the present disclosure improve upon existing methods and systems for performing services by providing access to a secured service kiosk twenty-four hours a day. While embodiments of the present disclosure may focus on automotive and vehicle services as an example, it should be well understood that the types of services offered by the kiosk should not be construed or limited to such automotive services. Embodiments of the service kiosk may be applied to any types of industries that a customer may order or procure services in exchange for payment and deposit or receive a key in return. For example, in addition to picking up and dropping of keys for automotive service, similar service kiosks may be used for procuring access to hotels, time shares, rental cars, recreational rentals such as motorcycles, go-carts and ATVs, and procuring storage lockers or self-storage spaces.

Embodiments of the secured service kiosk may schedule service appointments or other types of available service on behalf of customers, provide a secure storage area for keys belonging to the vehicle or vendor, being dropped off or retrieved after service is complete and allow secure payment to the service provider through the kiosk. As a result of the service kiosk being available 24 hours/day and in light of the service kiosk being entirely automated, a customer can schedule services, drop off and pick up the customer's vehicle at any time that may be convenient for the customer. The customer does not have to waste time interacting with the employees of the service provider or vendor during normal business hours or schedule an appointment ahead time, thus allowing for hassle-free services, including repairs and maintenance.

Embodiments of the service kiosk may operate by identifying the customer using a manual user input of the customer's information or by scanning the customer's driver's license. The service kiosk may obtain a record of the user, and information relating to the identification of the user including the user's personal information, vehicles, vehicle history and display a series of potential vehicles that may be serviced on the kiosk's user interface. Once a vehicle has been selected, the kiosk may further display available services that may be provided by the service provider. A customer may select one or more of the provided services, learn more details about the service and schedule the performance of the service with the service provider.

Embodiments of the service kiosk may include a deposit zone for collecting a key belonging to the vehicle selected for a service to be performed thereon. A customer may insert the key in the deposit zone of the service kiosk and store the key within the kiosk. Once deposited in the service kiosk, the key may be assigned a storage area for safe keeping and retrieval at a later time by a service professional or authorized personnel having access to the storage area. In some embodiments, a scannable code may be provided to the customer once the key has been deposited. The scannable code may be encoded with information identifying the customer, vehicle, services rendered and/or the storage location of the key deposited into the service kiosk. Embodiments of the scannable code may be printed onto a receipt by the service kiosk, emailed to the customer, displayed electronically or transmitted to a computing device loaded with a program capable of receiving the scannable code.

Subsequently, upon retrieval of the vehicle after the services have been provided, the customer may quickly recall a user account or profile information, including service details by scanning the scannable code provided by the kiosk during the drop off phase, using a scanning device connected to the service kiosk. Upon scanning the scannable code, the service kiosk may display summary information about the services rendered and the cost for the services performed via the user interface of the kiosk, an emailed summary, push notification, SMS message or display the summary electronically onto a separate client device selected by the customer. Furthermore, in some embodiments of the kiosk system, a user may select an appropriate payment type and provide payment to the service providers through the kiosk's payment processing system. For example, by entering a credit card into an onboard card reader, inserting cash into the kiosk or using a network accessible payment method such as PayPal, Apple Pay, Google Wallet, Amazon, Bitcoin or other electronic-based payment methods. In some embodiments, successful completion of payment may trigger the retrieval of the customer's key from storage. Each key may be held by a uniquely identified storage container in some embodiments of the key storage system. The service kiosk may remotely open and activate the storage container storing the user's key, releasing the key from the storage container and guiding the key to the retrieval zone of the kiosk, allowing the customer to remove the key from the service kiosk.

System for Performing an Automotive Service Transaction

Referring to the drawings FIG. 1 depicts an exterior view of an embodiment of a kiosk system 100 capable of performing an automotive service transaction. Embodiments of the kiosk system 100 may take any size, shape, and orientation and should not be limited to the embodiments depicted in the drawings, which are meant for illustrative purposes. The exterior surface 101 of the kiosk system may be decorated with ads, slogans, sponsors or helpful customer service information. Embodiments of the exterior surface 101 may be constructed out of any rigid material capable of encasing each of the components stored within the kiosk system 100. The exterior surface 101 may prevent sensitive portions of the interior components of the kiosk 100 from being exposed or damaged from the surrounding environment outside of the kiosk system 100. Examples of materials that may be used for constructing the kiosk system may include various metals, woods and plastics known by those skilled in the art such as stainless steel, galvanized plate, plywood, medium-density fiber board (MDF), polyurethane, UV coated polyurethane, acrylic, glass and tempered glass.

As shown in FIG. 1, embodiments of the kiosk system 100 may include a plurality of components integrated into the kiosk system 100 that may be accessible from the exterior surface 101 of the kiosk system 100. Each of the plurality of components may perform a specific function or purpose as part of the kiosk's communication with the customer, identifying customer accounts, scheduling the customer's service appointment and/or returning the vehicle to the customer upon completion of the service appointment. The plurality of components that may be accessible via the exterior surface 101 of the kiosk system 100 may include a speaker system 104, a card reader 106, a pin pad 108 (collectively referred to alongside the card reader 106 as a "payment system 129"), a deposit zone 110, a retrieval zone 114, a scanning device 125, a display device 121 and a camera system 127. Each of the individual components of the kiosk system may operate separately as a self-contained computing system or each of the interior components of the kiosk 100 may be electronically connected to a computer system 103 (described in detail below).

In some embodiments of the kiosk system 100, the speaker system 104 integrated into the kiosk system may output sounds and audio data, including instructions. In some embodiments, the speaker system 104 may translate or recite text or visual data displayed by the display device 121 of the kiosk 100 to the customer. Embodiments of the speaker system 104 may further be connected to a remotely accessible intercom system. During business hours and after business hours, a customer service representative or employee of the business tasked with providing the service to the customer, may speak to the customer through the speaker system 104, answer customer questions about the services offered or functionality of the kiosk system 100. For example, a customer having difficulty operating the kiosk system 100 to set up a service appointment may press an intercom or help button and have an employee or customer service representative verbally dictate and/or walk the customer though the operation of the kiosk system 100.

Embodiments of the kiosk system 100, may include a payment system 129. The payment terminal 129 may perform the function of inputting customer payment information into the kiosk system 100 and transmitting payment from the kiosk system 100 to a payment processing system in order to complete a payment transaction for services rendered by the service provider. Embodiments of the payment terminal 129 may comprise a card reader 106 and a pin pad 108. The card reader 106 may allow for kiosk system 100 to read data from credit cards and debit cards swiped through the card reader 106 in order to procure payment for the services performed by the service provider. The pin pad 108 may be an alpha numeric keypad for inputting credit or debit card information into the kiosk system 100 or for interacting with the kiosk system 100. For example, a customer may use the pin pad 108 to input a pin number or billing zip code associated with the credit or debit card previously inserted into the card reader 106, in order to complete a payment transaction. In some embodiments, the pin pad 108 may be utilized for directly inputting the credit or debit card number directly into the kiosk 100 instead of swiping the card using the card reader 106. In the exemplary embodiment of the payment terminal 129, the payment terminal of the kiosk 100 may comprise a Ingenico Intelligent Secure Pin Pad iUP 250 and an Ingenico Hybrid EMV card reader.

In some embodiments, the kiosk system 100 may include a camera system 127. The camera system 127 may be any recording system capable of recording and/or storing video data of the area in the vicinity of the kiosk system 100. The camera system 127 may, in some embodiments operate as a security camera and a deterrent from individuals attempting to harm the kiosk system 100 that may be left unsupervised by employees of the service provider. The camera system 127 may continuously record video data of the surroundings external to the kiosk 100 and store the video recordings within a computer storage device or remotely over a network to a network accessible storage device. In alternative embodiments, the camera system 127 may be used for identifying customers and subsequently loading customer information as a function of customer identification. For example, the camera system 127 may be loaded with facial recognition software or biometric scanning software. The camera system 127 may identify the customer upon the customer entering the view of the camera system 127, in front of the kiosk system 100 and automatically load a user profile based on the facial or biometric recognition of the customer.

Embodiments of the kiosk system 100 may include a display device 121. The display device 121 may output visual data from the kiosk system 100. The visual data may include instructions or prompts displayed by an interface 321 guiding the customer through the features of the kiosk system 100, including selecting a profile, selecting services, scheduling the services, completing the payment process and the deposition or retrieval of keys. In some embodiments, the display device 121 may be a computer screen, monitor, television or other display device including cathode ray displays, light emitting diode displays, electroluminescent displays, plasma display panels, electronic paper (E-ink) displays, liquid crystal displays, organic light emitting diode display, etc. In the exemplary embodiment of the current application, the display device 121 may be a touch screen display device or a display device that provides haptic feedback. The touch screen display may allow for a user to enter commands and user input by touching the appropriate icon or input displayed by a graphical user interface 321 being displayed by the touch screen. Examples of the graphical user interface at each step for scheduling automotive services are demonstrated in FIGS. 3b-6b of the drawings.

Additionally, embodiments of the kiosk system 100 may include scanning device 125. The scanning device 125 may be any scanning system capable of reading any type of machine readable representations of data that may be encoded into the data representation. Embodiments of the scanning device 125 may read bar 1D and 2D codes. For example, the codes read by the scanning device 125 may include universal product codes (UPC), EAN bar codes, Code 39 bar codes, code 128 bar codes, code 93 bar codes, ITF bar codes, Codabars, GS1 databars, MSI Plessey barcodes, QR codes, Datamatrix or micro-datamatrix codes, PDF417 or truncated PDF417 codes, Aztec codes, an any other type of coding system known by a person skilled in the art.

Figure 4:
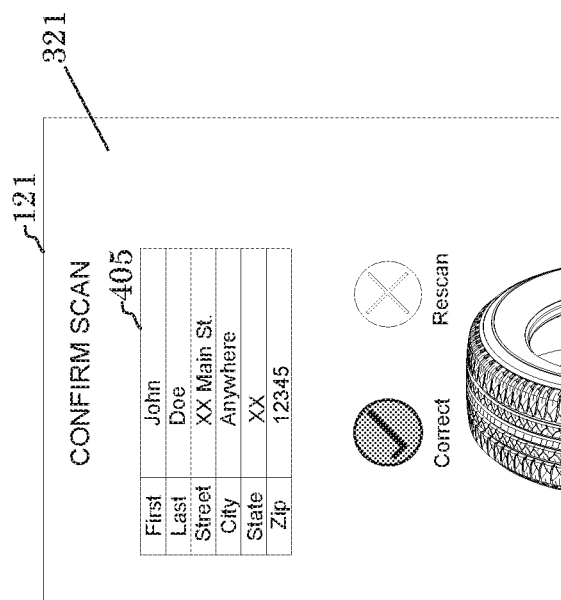
FIG. 4 depicts an embodiment of a kiosk system loading user information on a kiosk system interface as a function of scanning a user's driver's license.
Figure 4:
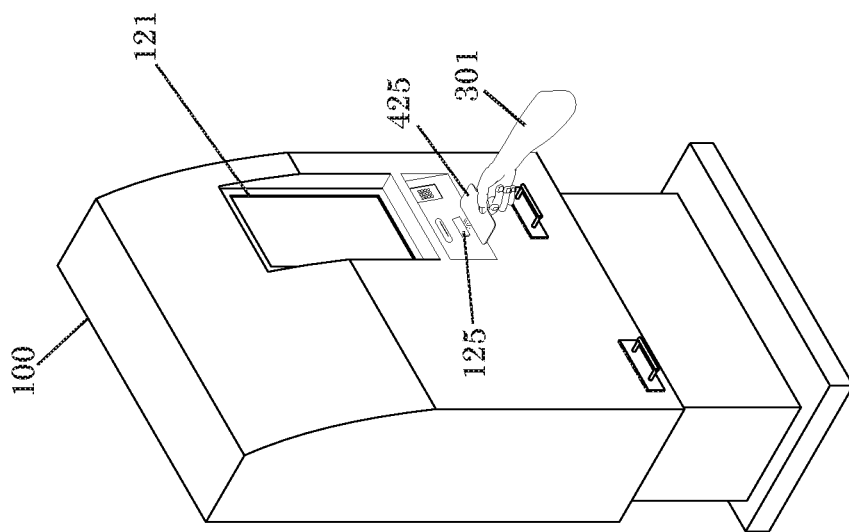

Embodiments of the kiosk system 100 may leverage the use of the scanning system 125 for data storage and to recall user profiles, work orders, service summaries and product purchases. For instance, in the exemplary embodiment, the scanning system 125 may query a user database or user profile records by scanning a barcode printed on a customer's driver's license 425. Scanning the barcode on the driver's license 425 may load a particular customer profile associated with the driver's license 425 as shown in FIG. 4, including relevant customer information such as the customer's name, address, vehicle information and prior service records. Likewise, in some embodiments of the kiosk system 100, a customer may receive printed receipts from a printing device 723 integrated into the kiosk 100 or an electronic receipt transmitted from the kiosk system 100 to a customer's computing device. Each receipt (whether paper or electronic) may include a unique, scannable code 520 that may be scanned by the scanning system 125. The unique scannable code 520 may be attached to the user's profile, the services being rendered and the location of any keys provided to the kiosk system 100. The scanning system 125 may scan the scannable codes 520 presented on the paper or electronic receipt at the time the customer picks up the vehicle receiving service (or returns a key for another service provided by the kiosk) in order to load the corresponding customer profile information, a summary of the services rendered, the bill for services rendered, and to initiate retrieval of the customer's key or return a key for a rental vehicle, hotel, timeshare, locker or other product that may be key operated.

Embodiments of the kiosk system 100 may include a deposit zone 110 and/or a retrieval zone 114 for depositing and retrieving a key 320 corresponding to the vehicle receiving service. A customer may initiate the deposit of the key when dropping off a vehicle for service and retrieve the key up picking up a vehicle after service has been completed and the appropriate payment has been made to the service provider. Both the deposit zone 110 and the retrieval zone 114 may be an openable, closable and/or lockable bin or container capable of being accessed from the exterior of the kiosk system 100. For example, the as shown in the drawings, the deposit zone 110 and retrieval zone 114 may be openable drawer feeding the key into or receiving the key from the interior of the kiosk system 100. Embodiments of the deposit zone 110 or retrieval zone 114 may fit flush with the exterior surface 101 of the kiosk system 100. However, the actions for opening or closing the deposit zone 110 and retrieval zone 114 may rotate, pivot or extend the zone from a closed to an open position.

Figure 6A:
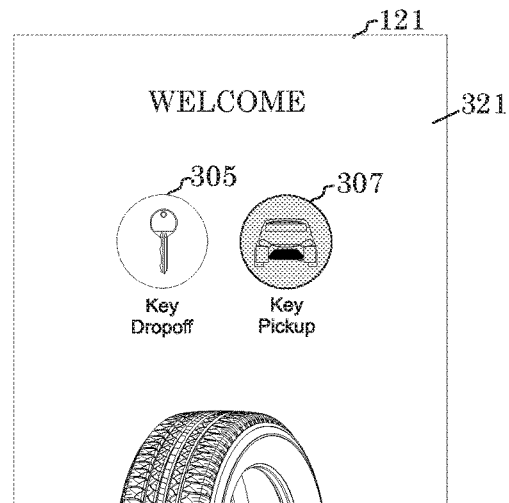
FIG. 6a depicts an embodiment of a kiosk system interface selecting an option to pick up keys.
Figure 6B:
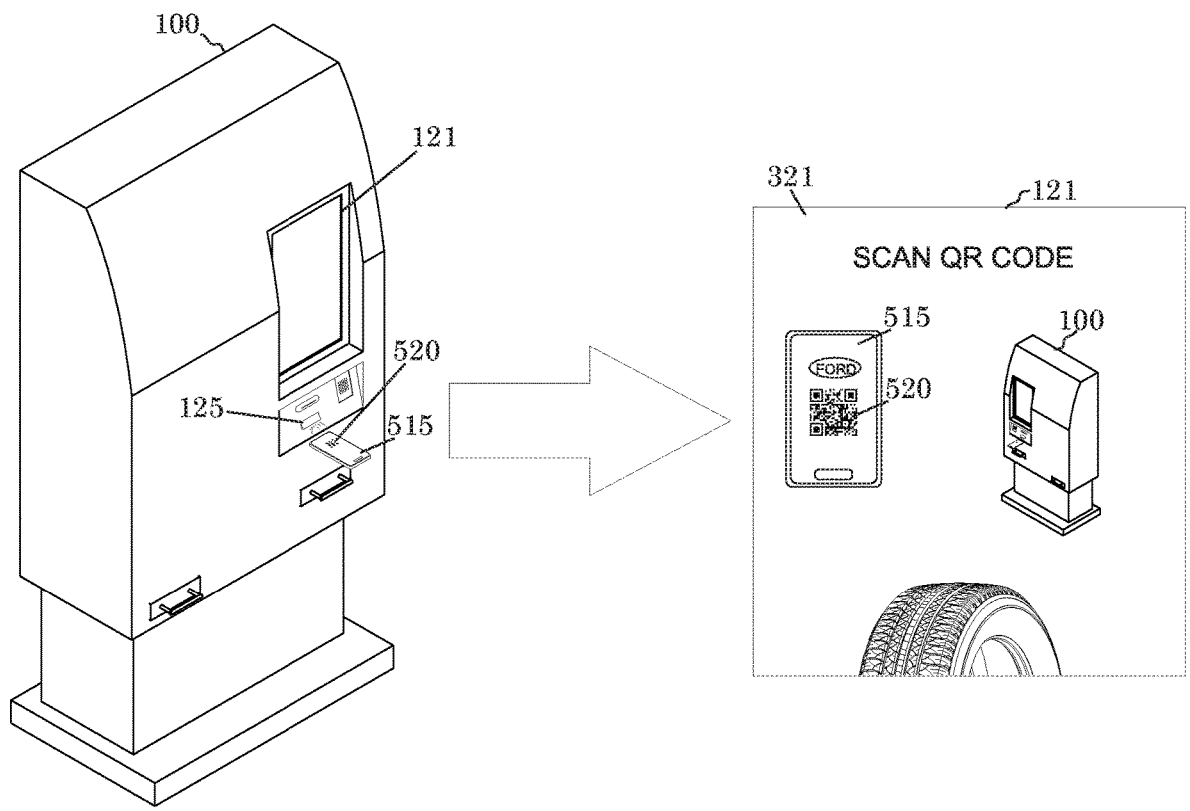
FIG. 6b depicts an embodiment of a kiosk system scanning a QR code to retrieve a previously deposited key.
Figure 6C:
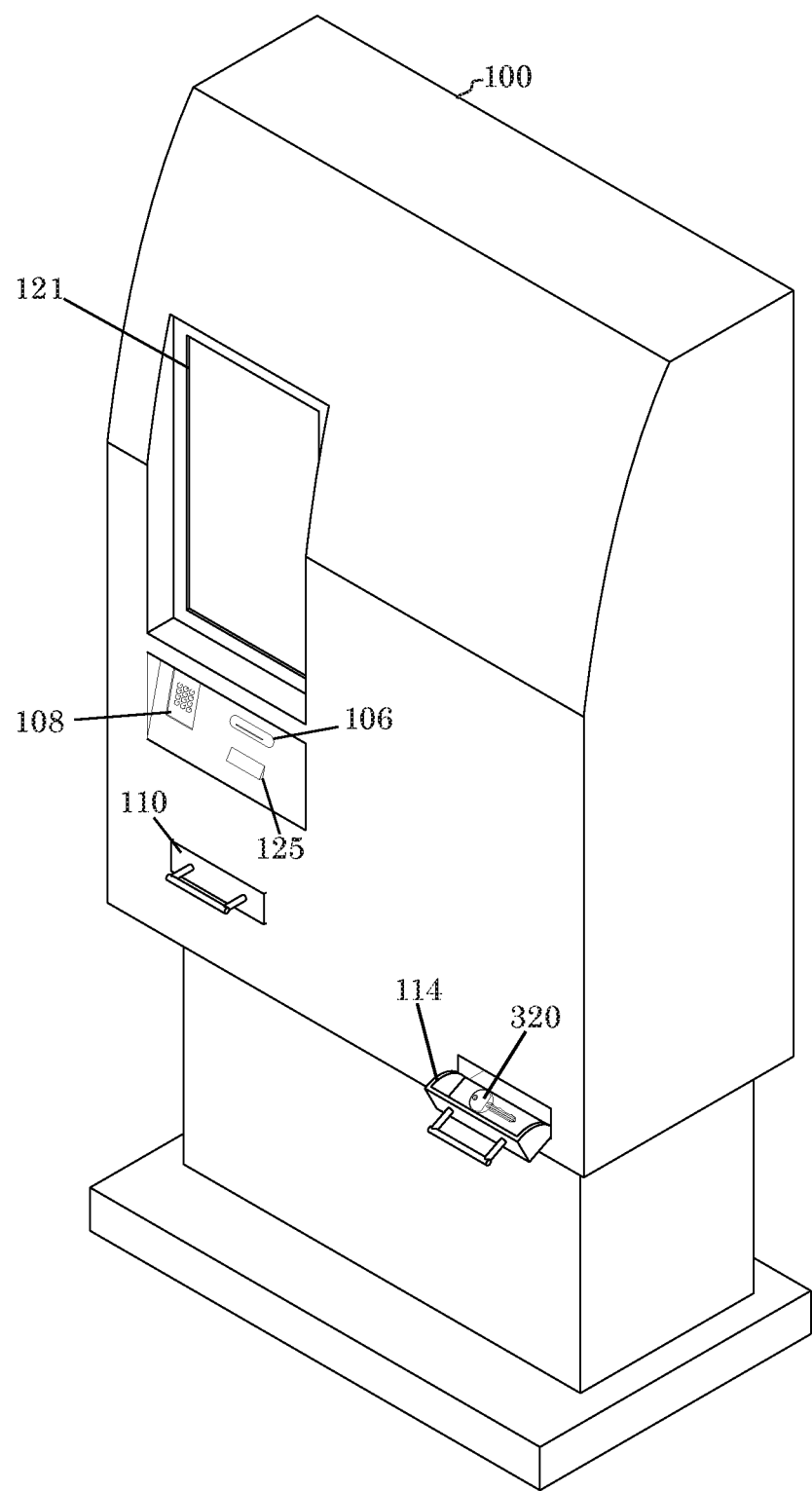
FIG. 6c depicts a user retrieving previously deposited keys from a retrieval area of an embodiment of a kiosk system.

For example, in FIG. 1, both the deposit zone 110 and retrieval zone 114 are placed in the closed position, wherein the interior contents of the deposit zone 110 and retrieval zone 114 are not exposed from the exterior of the kiosk 100. While the deposit zone and retrieval zone are closed, the contents therein may not be viewable in some embodiments. In alternative embodiments the deposit zone 110 or retrieval zone 114 may be constructed out of a transparent or translucent material that may allow for a customer to see the contents of each zone even while the deposit or retrieval zones 110, 114 are in the closed position. Likewise, in FIG. 3a, an example of the kiosk 100 is shown wherein the deposit zone 110 is placed in an open configuration. As shown, the deposit zone may pivot or rotate forward, revealing a container or drawer for receiving key 320. Upon closing the deposit zone 110 by rotating the drawer forward, the key 320 may be deposited into the kiosk system 100 for safe storage while waiting to begin service on the automobile. Similarly, FIG. 6c provides an illustration of the retrieval zone 114 in an open configuration. As depicted in the figure, the container or drawer may be rotated forward or slide outward from the exterior surface 101 of the kiosk 100, revealing a key 320 retrieved from the key storage system 116, housed within the kiosk 100.

Figure 2:
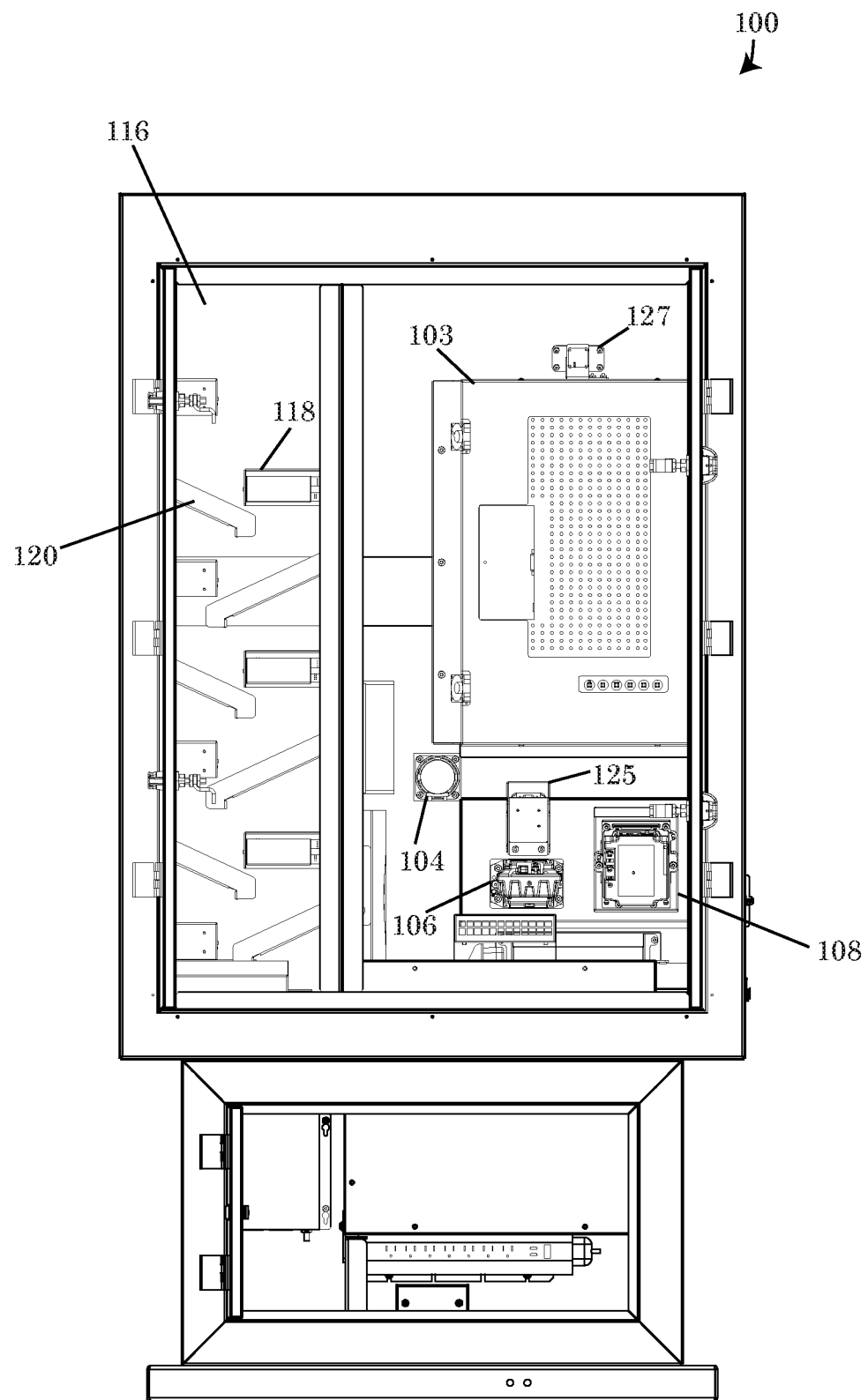
FIG. 2 depicts an interior rear view of an embodiment of a kiosk system.

FIG. 2 of the current disclosure provides an interior view of the inside of the kiosk 100. The interior view of this figure shows the arrangement of the plurality of components accessible from the exterior surface 101 of the kiosk system 100 as well as additional details describing an embodiment of the key storage system 116. Embodiments of the key storage system 116, may comprise a plurality of key storage containers 118, a plurality of ramped surfaces 120 and one or more stepper motors operated by a control board, such as a PCB, which may be electronically connected to computer system 103. Each key 320 deposited within the kiosk 100 may be assigned a storage container 118 within the kiosk storage system 116. When the keys 320 are deposited, each of the keys 320 may be placed manually or automatically via mechanical means into the requisite storage container 118 assigned by the kiosk system 100. An employee of the service provider may unlock the kiosk system 100, (specifically the key storage system 116) and acquire one or more keys 320 stored within the kiosk 100 as needed to perform the service on the vehicle or move the vehicle from the initial drop off point to a more appropriate position. Upon completion of the service, the keys 320 belonging to a particular may be deposited back into the kiosk 100, wherein the kiosk 100 may sort the deposited key back into the previously assigned storage container 118. Alternatively, in some embodiments, each of the keys 320 may be manually returned to the assigned storage container 118 by the employee of the service provider. When manually staging object/s (such as keys) to be retrieved, the objects may be placed into or onto the storage container. A signal may sent to the retrieval area alerting a service technician or other authorized personal as to which storage container to place the object, then a confirmation action by the service technician or authorized personnel may be made to acknowledge the object has be placed in the appropriate retrieval location thus sending a signal to the computer system of the kiosk.

Embodiments of the assigned storage containers 118 holding the keys 320 may be accessed from the exterior of the kiosk 100 by a customer. For example, a customer may request the retrieval of the keys 320 from the requisite storage container 118 selecting to pick up the customer's vehicle from the service provider using the scannable code 520 printed on the customer's paper or electronic receipt. Scanning the scannable code 520 may identify to the kiosk system 100 the storage container 118 currently holding the keys 320 belonging to the customer. Moreover, the kiosk 100 may instruct the storage container 118 to release the keys 320 from the container 118 and transfer the keys to the retrieval zone 114 of the kiosk 100. To perform the transfer of the keys 320, the kiosk 100 may initiate a motor positioned within the kiosk 100. The motor may be attached to each of the storage containers 118. Upon initiating the motor, the motor may open the storage container 118 causing the key 320 stored therein to be released.

As shown in FIG. 2, embodiments of the key storage system 116 may comprise not only a plurality of storage containers 118, but also a series of ramped surfaces 120 strategically positioned at a downward sloping angle throughout the key storage system 116. In the exemplary embodiment 100, each of the ramped surfaces 120 may form a zig zag pattern by positioning one or more ramped surfaces below each storage container 118. As noted above, during the retrieval and transfer of keys 320 from the assigned storage container 118, the motor may open the assigned storage container 118 holding the key belonging to the customer upon request of the customer. Once the motor opens the storage container 118, the key 320 contained therein may drop from the inside of the storage container 118 onto a ramped surface 120 positioned underneath. The key 320 move down the sloping ramped surfaces 120 and may navigate each of the ramped surfaces 120 until the key is transferred to the retrieval zone 114 at the bottom of the key storage area 116.

Figure 7:
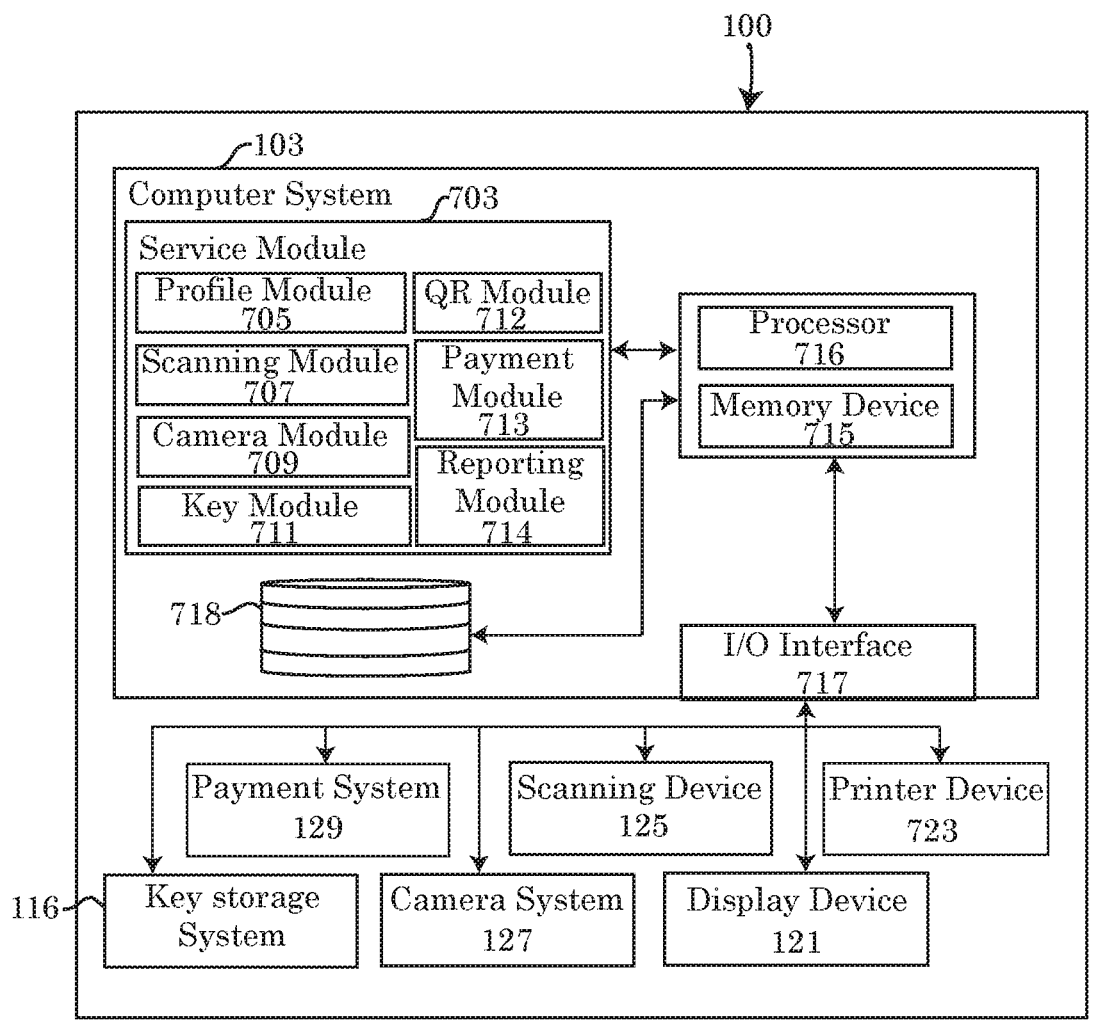
FIG. 7 depicts a block diagram of an embodiment of a service kiosk system.
Figure 8:
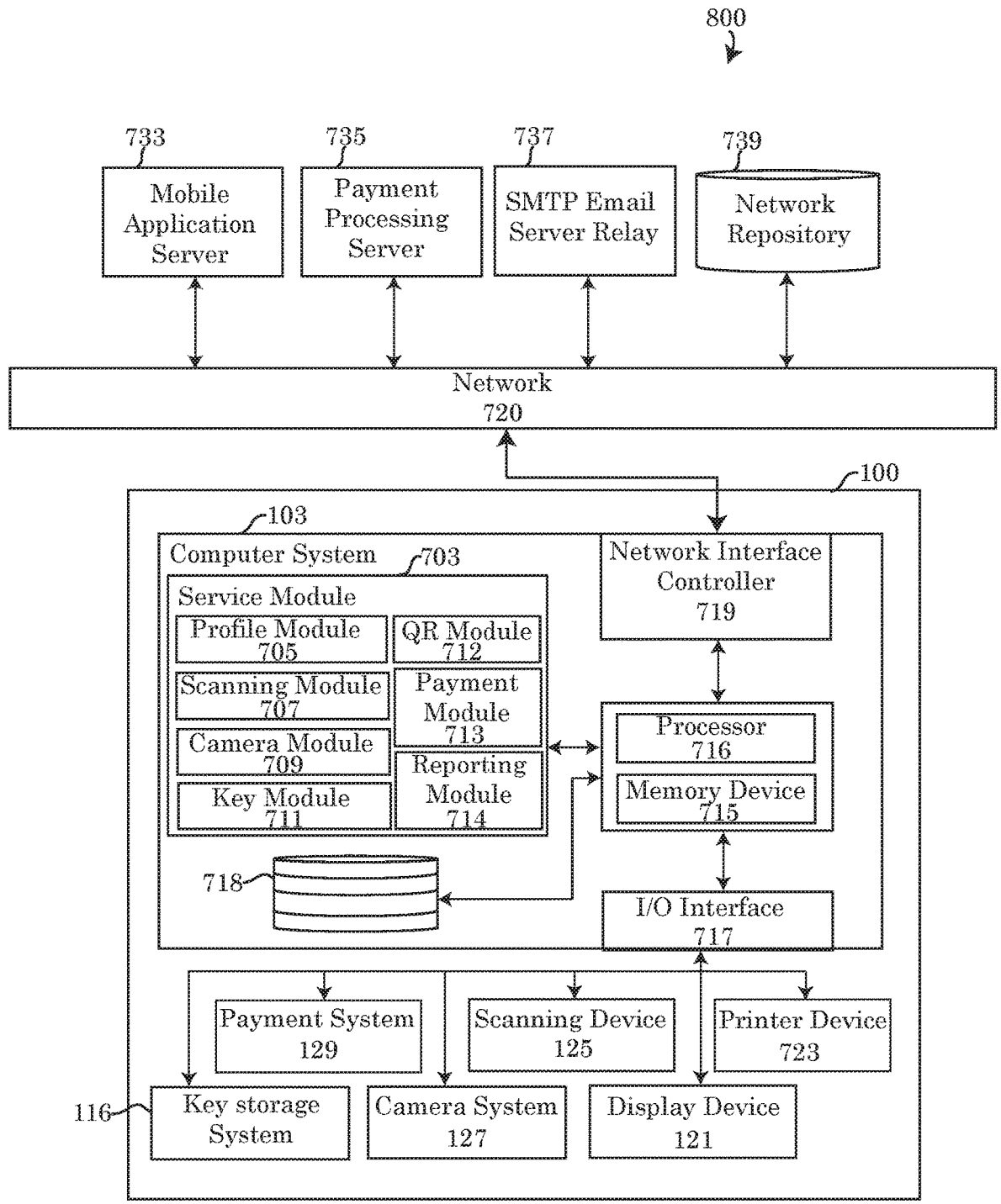
FIG. 8 depicts a block diagram of an alternative embodiment of a service kiosk system.

In some embodiments of kiosk 100, each of the components integrated within the kiosk system 100 may be connected to and/or controlled by a computer system 103. The embodiments of the kiosk 100 having an installed computer system 103 are illustrated in FIG. 2 and further diagramed in more detail in a block diagram depicted in FIGS. 7-8. Embodiments of the computer system 103 may connected through an input/output (I/O) interface 717 to each of the separate components of the kiosk 100 exchanging information between the computer system 103 and the components as either an input device or an output device. For example, the computer system 103 may be electronically connected to display device 121, scanning device 125, camera system 127, payment system 129, key storage system 116 and a printing device 723.

Embodiments of the computer system 103 may be a specialized computer system which may include a processor 716, specialized hardware or circuitry and/or software loaded in the memory device 715 of the computer system 103. The embodiments of the computer system 103 may perform functions, tasks and routines relating to the scheduling and performance of an automotive transaction as described throughout this application. Embodiments of the specialized hardware and/or software integrated into the computer system 103 of the kiosk 100 may be part of a service module 703. Hardware and/or software components of the service module may include a profile module 705, a scanning module 707, camera module 709, key module 711, QR module 712, payment module 713 and reporting module 714.

As used herein, the term "module" may refer to a hardware module, software-based module or a module may be a combination of hardware and software resources of the computer system 103 and/or resources remotely accessible to the computer system 103 via a computer network 720 and/or the I/O interface 717. The computer system 103 may be connected and placed in communication with other network accessible computing devices in some embodiments, including a mobile application server 733 providing content from the kiosk 100 to a customer's client device 515, a payment processing server 735 responsible for completing payment transactions, SMTP email server relay 737 which may be responsible for transmitting communications from the kiosk 100 to the customer's email server, and a network repository 739 which may be responsible for storing information, data, the kiosk's 100 programmable objects used for user interface 321, etc.

Embodiments of the network 720 may be constructed using wired or wireless connections between each computing device connected to the network 720. As shown in the exemplary embodiment 800 of FIG. 8, each of the computing devices 103, 733, 735, 737, 739 may connect to the network 720 and communicate over the network 720 using a network interface controller (NIC) 719 or other network communication device. Embodiments of the NIC 719 may implement specialized electronic circuitry allowing for communication using a specific physical layer and a data link layer standard, such as Ethernet, Fiber channel, Wi-Fi or Token Ring. The NIC 119 may further allow for a full network protocol stack, enabling communication over network 720 to the group of computing devices or other computing hardware devices linked together through communication channels. The network 720 may facilitate communication and resource sharing among the computer computing devices 103, 733,735, 737 and additional hardware devices connected to the network 720, for example a network accessible storage device such as a network accessible data repository 739. Examples of network 720 may include a local area network (LAN), home area network (HAN), wide area network (WAN), back bone networks (BBN), peer to peer networks (P2P), campus networks, enterprise networks, the Internet, and any other network known by a person skilled in the art. In the exemplary embodiment of the kiosk 100, the kiosk may be connected through a cloud computing network to the network accessible computing devices 733, 735, 737, 739.

Embodiments of the modules described in this application, whether comprising hardware, software or a combination of resources thereof, may be designed to implement or execute one or more particular functions, tasks or routines of the computer system 103 and the kiosk 100 as described herein. Embodiments of hardware-based modules may include self-contained components such as chipsets, specialized circuitry and one or more memory devices comprising a memory storage medium (described below). A software-based module may be part of a program code or linked to program code or computer code 1097, 1098 containing specific programmed instructions loaded into the memory device 715 of the respective computer system 103, and/or a remotely accessible memory device 715 of a network accessible computing device. For example, in some embodiments the network accessible computer device may be a web server, application server 733, 735, 737, or network accessible hardware, such as a network accessible storage device or repository 739.

Embodiments of the service module 703 may save, edit and load customer profiles; query and load customer profiles as a function of scanning a driver's license or biometric recognition of the customer through the camera system 127; schedule automotive services tied to the customer's profile; collect, organize, store and retrieve customer keys 320 from the key storage system 116; print or transmit electronic receipts comprising a scannable codes 520; process customer payments to the service provider. In some embodiments of the computer system 103, the service module 703 may comprise one or more sub-modules that may be assigned to perform one or more particular tasks or functions of the computer system 103 and/or kiosk 100. The types and number of sub-modules may vary from embodiment to embodiment depending on the components and arrangement of components featured in the kiosk system 100. However, in the exemplary embodiments of the computer system 103 shown in FIGS. 7-8, the service module may comprise a profile module 705, scanning module 707, camera module 709, key module 711, QR module 712, payment module 713 and reporting module 714.

Embodiments of the profile module 705 may save, edit, load and amend profile information about the customers accessing the kiosk 100. A customer accessing the kiosk 100 for the first time may, in some embodiments create a customer profile and store the customer profile locally in the local repository 718 or database of the kiosk 100. Alternatively, in some embodiments, the customer profiles may be stored on the network 720 in a network accessible repository 739, database or other computing device, allowing for the customer profile to subsequently be retrieved and loaded in each kiosk having access to the customer profile data. For example, a particular service provider may have multiple locations offering services to customers. The profile module 705 may access the customer profile information stored on the network 720, allowing for the kiosk 100 to retrieve customer profile information regardless of whether the customer has previously visited the current location of the kiosk 100 being accessed.

Embodiments of the customer profiles accessed and amended by the profile module 705 may include customer information 405 as shown in FIG. 4-5a, including the customer's name, address, phone number and one or more vehicle makes and models owned by the customer. The customer profile accessed by the profile module 705 may further include a service history or service record for each of the vehicles associated with the customer's profile. The service history may be taken into account by the service module 703 when presenting one or more services available to the customer when the customer is selecting services 507 to be scheduled for completion, as shown in FIG. 5c-5d of the current application.

In some embodiments of the kiosk 100, the profile module 705 may be instructed to load a customer profile as a function of user input into the kiosk 100. During the service scheduling and key drop-off 305 phase of scheduling an automotive service, the customer profile may be loaded into the profile module 705 and displayed by the display device 121 using various methods. In some embodiments, a customer 301 may select to manually input 310 a customer's information into the computer system 103 of the kiosk 100. For example, the customer may use the touch screen of a display device 121 or the pin pad 108 to manually enter a customer's name, vehicle information, VIN number, driver's license number or any other identifying information about the customer or the vehicle that would allow for the profile module 705 to identify the user and retrieve the profile either locally from the computer system's data repository 718 or remotely via a network 720 accessible resource.

In alternative embodiments, a customer may load a customer profile into the profile module 705 by using a scanning device 125 of the kiosk 100. As shown in FIG. 3b, the customer 301 may select a license scan option 309 instead of manually enter customer information into the kiosk 100. In some embodiments, the scanning module 707 may work in conjunction with the profile module 705 to obtain user data relevant for loading the appropriate profile module. Embodiments of the scanning module 707 may responsible for decoding bar codes from driver's licenses as well as scannable codes 520 (presented during the pickup phase), identifying the type of code being presented and retrieving relevant information relating the information presented in the bar codes. For example, as shown in FIG. 4, a customer 301 may present a driver's license 425 to the scanning device 125 in order to login to the kiosk 100 with the appropriate customer profile. The scanning device 125 may read the bar code or license number printed on the driver's license 425. The data encoded as the barcode may be transmitted from the scanning device 125 to the scanning module 707, which is able to decode the scanned bar code data and further identity the decoded data as information obtained from a driver's license 425 (as opposed to a scannable code 520). The scanning module 707 may query a database or repository 718, 739 which may contain records of driver's license 425 information for each customer registered with the service provider or kiosk company. The scanning module 707 may compare the driver's license 425 data decoded by the scanning device 125 with the customer records accessible to the computer device 103. Upon identifying a record of a customer profile that matches the data scanned from driver's license, the scanning module 707 may transmit the identified customer record to the profile module 705 so that the customer profile may be loaded into the memory device 715 of the kiosk 100 and displayed to the customer 301 accessing the kiosk's interface 321.

In some embodiments of the service module 703, a camera module 709 may be included. The camera module 709 may initiate, record, store and transmit video data recorded by the camera system 127 which may be integrated into the kiosk 100. The camera module 709 may perform the function of initiating or terminating the camera system 127 from recording video data of the exterior of the kiosk 100. In some embodiments, the camera module 709 apply one or more facial recognition or biometric algorithms to identify a customer 301 approaching the kiosk 100 or entering the service provider's business. The camera module 709 receiving the video data from the camera system 127 may query a database of customer information to identify the customer based on the recorded facial or biometric features. The camera module 709 may track and/or alert the service provider when one or more particular customers have entered the business.

Moreover, the camera module 709, upon identifying the individual entering the service provider's business, may queue the customer's profile in the profile module 705. As the customer steps up to the kiosk 100, the kiosk 100 may quickly load the previously identified customer's profile, cutting down on the amount of time needed to access the kiosk 100 and streamlining the service selection or retrieval of the customer's vehicle. Moreover, in some embodiments, the camera module 709 may further be used direct the camera system 127 to record a confirmation image of an object, such as a key being deposited or retrieved from the kiosk system. The recordation of the object being deposited may ensure that the customer is depositing the proper object needed to providing service to the customer or properly returning the property of the service provider. In some embodiments, the camera system 127 may be equipped with object recognition software programmed to identify objects, such as keys being deposited. The object recognition software may further be equipped with a database of the service kiosk keys and may cross reference an image of a deposited key with the returned key, which may further demonstrate that a customer has received the correct property back or that the kiosk is receiving the correct key up on return of the customer.

Embodiments of the service module 703 may include a key module 711. The key module 711 may perform the task of assigning key storage locations 118 to each of the keys 320 deposited within kiosk 100 and releasing the keys 320 from the assigned key storage location 118 upon receiving a request by the kiosk 100 to retrieve the key 320 from the key storage system 116. In some embodiments, the key deposit zone 110 or key retrieval zone 114 may also be remotely locked by the kiosk 100 using an electronic lock, to prevent tampering with the kiosk 100. The key module 711 may be responsible for engaging and/or releasing the electronic locks of the deposit zone 110 or the retrieval zone 114 to allow for the deposition or retrieval of keys from the kiosk 100. For example, a customer may be unable to open the deposit zone 110 due to an engagement of an electronic lock, until instructed to open the deposit zone 110 by the interface 321 of the kiosk 100. Instructions to open the deposit zone 110 may not occur in some embodiments until after the customer has been identified and the appropriate services have been finalized with the kiosk system 100. Likewise, in some embodiments the retrieval zone 114 of the kiosk 100 may be electronically locked and maintained by the key module 711 until the key 320 being retrieved by the customer 301 has been released from the storage container 118 and loaded into the retrieval zone 114. Electronically locking the retrieval zone 114 may prevent customers from tampering with the kiosk 100 or inserting inappropriate objects into the kiosk 100 as well as prevent customers from inadvertently attempting to deposit keys 320 in the retrieval zone 114.

Embodiments of the key module 711 may further generate scannable codes 520 encoded with customer identifying information and key storage information, including the storage container 118 assigned to hold the customer's keys 320. In some embodiments, the key module 711 may be with a program code or algorithm for generating a scannable code 520, such as a QR code or UPC code. In alternative embodiments, the generation of the scannable code 520 assigned to a customer's service order may be generated by a separate module from the key module 711. For example, in the embodiment 800, of the kiosk system, a QR module 712 may be used separately from the key module 711 to generate the scannable code 520 (i.e. a QR code). As shown in FIGS. 5e-5f, the key module 711 or QR module 712 may generate the scannable code as a function of completing a service order with the kiosk 100 and/or depositing keys 320 within the deposit zone 110.

Upon execution of the service order and/or deposit of the key 320, the key module 711 and/or QR module 712 may generate the scannable code 520 and display, print or electronically transmit the scannable code 520 to the customer. For example, in one embodiment, the scannable code 520 may be generated and scannable code data may be transmitted to printer device 723, wherein the scannable code may be outputted onto a printed receipt at the kiosk 100 and received by the customer. Alternatively, in another embodiments, the scannable code 520 may be generated and transmitted over network 720 to a mobile application server 733 or an SMTP email server relay 737, wherein the scannable code 520 may be electronically delivered to an application, hosted by the application server 733, being executed by a customer's client device 515 and/or delivered to a customer's email address registered in the customer's profile saved by the kiosk 100.

Embodiments of the service module 703, may further include a payment module 713. The payment module 713 may be responsible for receiving payment data entered into the kiosk 100 via the payment kiosk's payment system 129. For example, the payment module 713 may receive payment data from a credit card or debit card being read by the card reader 106. The payment data entered into the payment module 713 may be tied to a specific transaction for services rendered by the service provider. The payment module 713 may tender the payment data and transmit the payment information to a payment processing server 735 or third party payment processor, such as the requisite bank or credit card provider. In some alternative embodiments, alternative funding options may be available and tendered by the payment module 713. These alternative funding options may include internet-based payment systems such as PayPal, Apple Pay, Google Wallet, Bit Coin, Amazon Payment services, blockchain payment services or any other form of digital currency that may be accepted for payments. The payment module 713 may receive the payment data from the selected funding option and remotely access the authentication server via network 720 to confirm the legitimacy of the payment source and complete the transaction.

Embodiments of the service module 703 may further comprise a reporting module 714. A reporting module 714 may be tasked with the function of reporting service transactions to the customer, displaying the visual data of the user interface 321 on the display device 121 and generating reports for the customer and/or the service provider to view. The reporting module 714 may generate reports detailing customer interactions with the kiosk 100, services ordered, patterns in customer usage including the most popular vehicle drop off and return time, total sales using the kiosk 100, the amount of value from upselling, customer service reports and complaints directed toward the service provider. The reporting module 714 may further generate detailed reports describing to the service provider the efficiency of the service provider's employees, services, average cost per transaction, the most popular vehicles serviced or maintained by the service provider and the most popular services rendered by the service provider as a function of customer data collected and/or stored by the kiosk 100.

In some embodiments, the reporting module 714 may be responsible for generating and transmitting alerts and notification to customers. The alerts or notifications may be sent via SMS, direct messaging to a client device 515, push notifications to a client device 515, email or any other communication system known by a person skilled in the art. The alerts and notification may include maintenance reminders, recommended services and coupons in some embodiments. In other embodiments, the alerts and notifications may inform the customer that the service provider has completed the requested services scheduled, the total cost of the service and an appropriate time to pick the vehicle up after the completion of the scheduled service.

Method for Performing an Automotive Service Transaction

Figure 9:
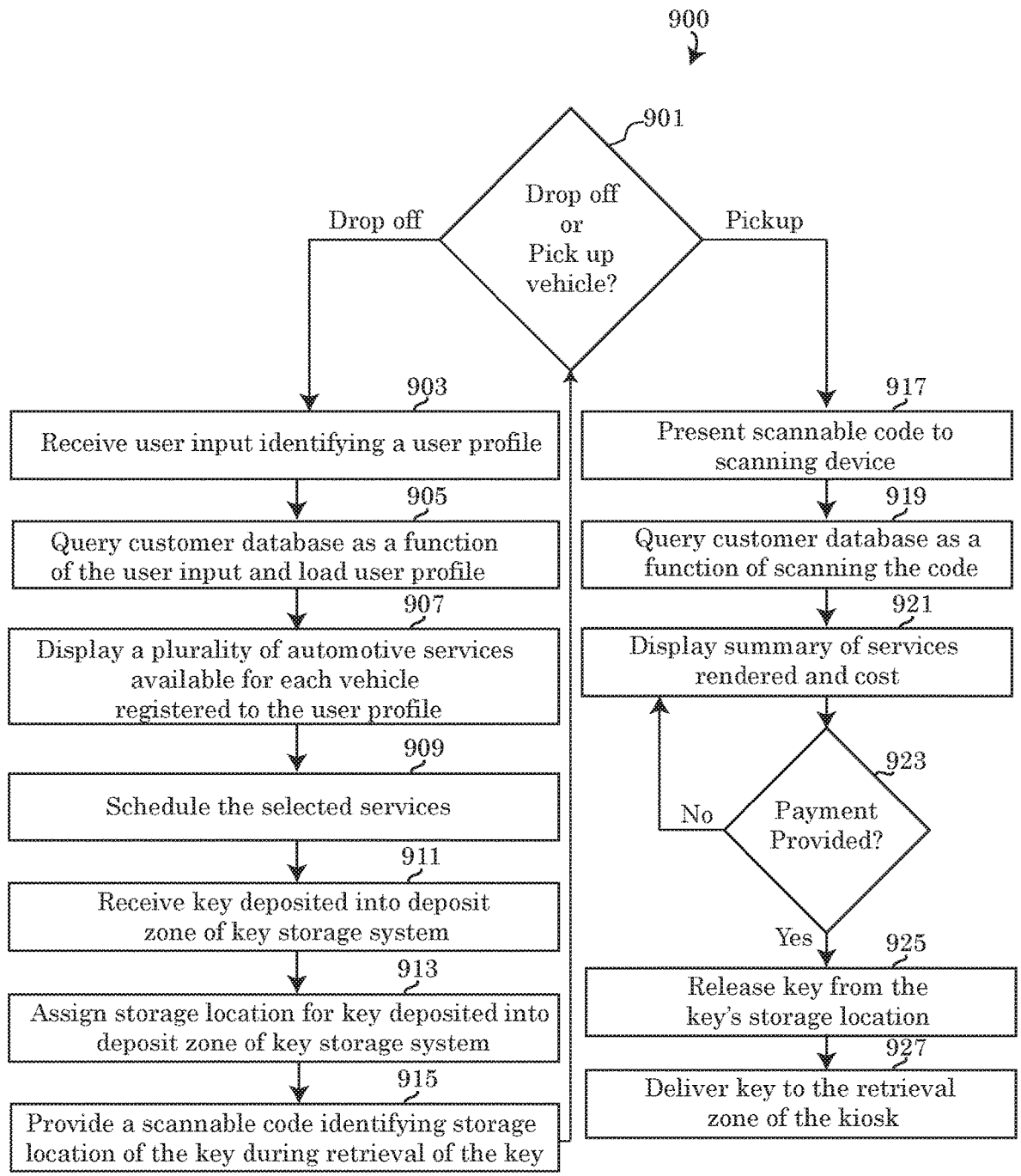
FIG. 9 depicts a flow chart of an embodiment of an algorithm for performing an automotive service transaction.

The drawing of FIG. 9 represents an embodiment 900 of a method that may be implemented for performing an automotive service transaction in accordance with the systems described in FIGS. 1-8 using one or more computer systems defined generically by FIG. 10 below and more specifically by the specific embodiments of FIGS. 1-8 described throughout this application herein. A person skilled in the art should recognize that the steps of the method described in FIG. 9 may not require all of the steps disclosed herein to be performed, nor does the algorithm of FIG. 9 necessarily require that all steps be performed in the particular order presented. Variations of the method steps presented in FIG. 9 may be performed, wherein one or more steps may be performed in a different order than presented by FIG. 9.

The algorithm 900 described in FIG. 9 may initiate in step 901 by first identifying whether a customer, accessing kiosk 100, is seeking to drop of a vehicle for a scheduled service to be performed thereon or pick up a vehicle that has previously had service completed thereon. An example of this step can be seen in FIG. 3b. In FIG. 3b, a kiosk interface 321, displayed by display device 121 of the kiosk 100, provides a plurality of options for a customer 301 operating the kiosk 100. The first set of option displayed by the user interface 321 of kiosk 100 may be an election between performing a drop-off 305 or a pickup 307 of a vehicle. In some embodiments of the kiosk 100, the customer may elect the desired option by touching the icon on the display device 121 corresponding to the customer's election to either drop off or pick up a vehicle. Accordingly, if, in step 901 the customer elects to drop off a vehicle, the method may proceed to step 903, whereas, if a customer has elected the option to pick up a vehicle, the method may proceed to step 917 as shown in the algorithm of FIG. 9.

In step 903 of the method 900, the kiosk 100 may receive user input from a customer (which may be used interchangeably with "user"). The user input provided by the customer may aid the kiosk in the identification of the customer's user profile which may be subsequently loaded by the profile module 705. As shown in the embodiment of FIG. 3c, a user may identify or access the customer's user profile by electing one of the options presented by the kiosk. For example, a customer may elect from a license scanning option 309, a manual input 310 option allowing for the customer's user information to be directly entered into the kiosk 100 through the user interface 321, or a biometric input 311 option which may include facial recognition or iris scanning by the camera system 127 and/or fingerprint scanning by the scanning device 125.

In an instance whereby the user's identifying information is inputted using the manual input 310 option, the customer 301 may type in identifying information directly into the kiosk to initiate a query of the customer's profile. For example, by typing in a customer name, username/password, address, email, phone number, VIN, or any other identifying features about the user, the user's vehicle or unique customer profile. Under the license scanning option 309, user input may identify the user profile by scanning a driver's license 425 using the scanning device 125 of kiosk 100. Embodiments of the scanning device 125 may scan a bar code or serial number printed on the driver's license 425. The scanning module 707 may receive bar code data of the driver's license 425.

In other embodiments, the user may select the biometric input 311 option as a form of user input to identify the user profile associated with the customer. A user electing to use the biometric input 311 option may subsequently, after selecting the option, proceed to provide biometric data to the kiosk 100. For instance, the kiosk 100 may scan the user's facial features, finger print, iris, retina, record voice information, etc. and compare the biometric data collected at the kiosk 100 with biometric data previously collected by the kiosk 100 at the time the user profile may have been created.

In yet another alternative embodiment, the customer may elect to use an application input 312 option in order to retrieve the appropriate user profile. For example, a customer may have a client computing device 515 equipped with a program or application capable of interfacing with the kiosk 100, such as the Ford® Pass application. A customer may utilize the separate computing device 515 loaded with the appropriate kiosk communication application to transmit profile information stored locally by the client computing device 515 or remotely accessible via the application server 733 to the kiosk 100. In some embodiments, the computing device 515 may use Blutooth, Blutooth LE, Wi-Fi, RFID or Near-Field Communication (NFC) protocols to interface with the kiosk 100. The customer select to perform the transmission through the interface of the client device 515 or, the customer's client device may automatically supply the user profile information based on the customer's proximity to the kiosk 100 within a pre-defined distance. The customer may load the customer's user profile automatically or may be prompted on the user interface 321 whether the customer would like to load the customer's profile. The separate computing device 515 may be a mobile computer device, smartphone, cell phone, tablet computer, PDA or may even be integrated into a key fab or a computer chip integrated into key 320 of the vehicle itself.

In step 905, the service module 703 may query a database or other type of data structure as a function of the user input entered in step 903 to retrieve the user profile associated with the customer and load the user profile into the memory device 715 of the computer system 103. The query and retrieval actions of step 905 may be performed by comparing the user input either manually entered, scanned or transmitted to the kiosk 100 with the corresponding information stored by the Kiosk 100 either locally or remotely. For example, user profile information may be stored in a local data repository 718 or network accessible repository 739 such as a cloud data repository. For instance, in the exemplary embodiment, user profile information may be stored remotely in a proprietary database of a cloud network such Amazon's S3 cloud storage or an open source cloud database similar to MongoDB. As shown in FIG. 4-5a, upon retrieval, loading and display of the customer profile, the customer may have the opportunity to confirm that the customer's information 405 being displayed by the kiosk 100 is correct, including the customer name, address, phone number, email address and vehicle information 501. Sometimes, a user may desire to add, remove or amend one or more vehicles listed in the user profile. Upon loading and displaying the user's profile, the user may add, delete or amend vehicle information and save the changes to the user profile. In some embodiments, such as the embodiment shown in FIG. 5b, the customer may further create a custom pin number 503 for a particular transaction within a kiosk session or to protect the customer profile in general from being loaded by an unauthorized person. A customer may be prompted in some instances to create a pin number or password for the current session being displayed under the user's profile, wherein a subsequent login to access the service information or profile may prompt the subsequent login to further provide a secure pin number.

Once the user's profile has been retrieved and loaded in step 905, in step 907 the kiosk 100 may display a plurality available services for the customer to select from via the user interface 321 being displayed by the display device 121. The services may be a generic list of all available service provided by the service provider in some embodiments. In alternative embodiments, the list of services 507 displayed by the display device 121 may be dependent upon the vehicle selected from the user profile. In step 909, the user may schedule services by selecting one or more of the services 507 from the list of available services displayed by the display device 121. For example, in FIG. 5c, the display device 121 displays a plurality of services 507 for the selected vehicle and these services include services relating to the engine, oil, battery, brakes, and tires. These services are merely basic examples of services that may be rendered. Any type of specific or detailed vehicular services or maintenance options may be available, including each of the services that may be described in the owner's manual of each vehicle manufacturer. In some embodiments, once the services are selected in step 909, further details about each of the services may be displayed as shown in FIG. 5d. The user interface 321 may provide additional information about the scope of each service selected, the cost of the service, the cost of any parts that may need to be purchased, the amount of time to perform the service and/or an expected completion date or time. The user may subsequently confirm the selected services 507 to schedule the services for completion by the service provider. In some embodiments, the kiosk 100 may provide a list of recommended services which may be based on the services selected (i.e. commonly paired services, such as new tires/alignment, or oil change/tire rotation). The kiosk 100 may also recommend services based on the vehicle information on file in the user profile, including recommendations based on the age or mileage of the vehicle. In some embodiments, the customer may choose to provide payment at the time of scheduling in some embodiments. In other embodiments, the customer may pay for the services at the time of scheduling and any remaining balance at the time of pick up.

In step 911 of embodiment 900, the customer may deposit the key 320 into the deposit zone 110 of the kiosk 100. Embodiments of the kiosk 100 may provide an on screen guide via the user interface 321 with an indicator 510 indicating the appropriate time for depositing the key 320 and the location of the deposit zone 110. In some embodiments, the key module 711 may disengage an electronic lock preventing unauthorized access to the deposit zone 110. A customer may open the deposit zone 110 as shown in FIG. 3a and place the key 320 into the deposit zone 110. The customer may subsequently close the deposit zone 110 depositing the key 320 inside the kiosk 100 for storage purposes.

In step 913, upon confirmation the deposit of the key 320 into the kiosk 100, the key module 711 may assign a storage location 118 for the key 320 inside the key storage system 116 of the kiosk 100. Embodiments of the key module 711 may query a data table or array in order to identify an empty storage container 118 within the kiosk 100. The key module 711 may assign the key 320 to the open storage container. In some embodiments, a mechanical mechanism may be instructed by the key module 711 to remove the key from the deposit zone 110 and place the key 320 into the assigned storage container 118. Alternatively, in some embodiments, the kiosk 100 may print via the printing device 723 or supply near the kiosk a label that may be attached to the key 320 prior to deposition of the key 320. The attached label may make sorting/returning the key to the proper storage location 118 easier for employees of the service provider. In some embodiments, the labelled and deposited keys 320 may be collected into a centralized bin or container within the deposit zone 110. An employee of the service provider may sort the keys according to a list or table created by the key module 711.

In step 915 of the embodiment 900, the key module 711 and/or the QR module 712 may generate and provide a scannable code 520 to the customer. The scannable code 520 may encode information relating to the user's profile, user information, vehicle information, selected services, service costs, whether payments have been received and/or the key storage location 118. The scannable code 520 may be delivered to the customer through a plurality of available options. For example, in one embodiment the scannable code 520 may be provided on a printed receipt. In step 915, the printed receipt may be printed by a printer device 723 integrated as a component of the kiosk 100 and comprise the scannable code 520 printed thereon. Alternatively, in other embodiments, the service module 703 may transmit the scannable code 520 to an email address registered with the kiosk 100 and listed in the user's profile. The service module 703 may transmit the email information over network 720 to a customer SMTP email server relay 737 responsible for delivering the emailed message comprising the scannable code 520 to the customer. In yet another alternative embodiment, the scannable code 520 may be transmitted via a mobile application server 733 or over a short range transmission protocol such as Wi-Fi, Bluetooth, Bluetooth LE, NFC, RFID to a client device 515, as shown in FIG. 5f of the current application.

Referring back to step 901, in some instances, a customer may be picking up a vehicle that has received service rather than dropping off a vehicle. Under such a circumstance, the method 900 may proceed to step 917 instead of step 903 described above. In step 917, a customer may begin the process for completing the service transaction and receive the customer's keys 320, previously deposited in step 911 by presenting a scannable code 520 to the scanning device 125 or by a camera system 127 capable of reading the scannable code 520. The scannable code 520 may be scanned by the scanning device regardless of the format that the scannable code 520 was previously provided in step 915. For example, the customer may present the scannable code 520 by scanning a printed receipt provided by kiosk 100 or a printed copy of the scannable code 520 that may have been received by the customer in an email or transmitted via an application designed to interface with the kiosk 100. Alternatively, the customer may also present a digital copy of the scannable code 520 stored by the customer's client device 515 or other computing device. The digital copy of the scannable code 520 may be a digital copy of an email, SMS, image file, or any other digital representation of the scannable code 520 being displayed by a computing device display. The scanning device 125 or camera system 127 may scan the digital version of the scannable code 520 or recreation thereof.

Once scanned, the service module 703 of the kiosk's computer system 103 may, in step 919, query a data repository, database, data table or other type of data structure storing the information digitally represented by the scannable code 520, as a function of scanning the scannable code 520. The information represented by the scannable code 520 may be stored locally in a local data repository 718 or remotely in a network accessible repository 739. The service module 703 may store the data returned by the query performed in step 919 in the memory device 715 of the computer system 103 and in step 921 displays a summary of the services performed as well as the costs for performing the services.

In step 923, the method may determine whether or not payment has been provided for the services displayed in the summary of services of step 921. If payment has not been provided, a customer may proceed to select a payment method and proceed with the payment transaction. The customer may use the payment system 129 physically integrated into the kiosk 100 to initiate the payment transaction. For instance, the customer may use the card reader 106 to provide initiate a transaction via a credit card, debit card, gift card or other card based payment. Alternatively, a customer may manually enter payment information into the kiosk 100 using the touch screen interface displaying a virtual keyboard or using the pin pad 108. In some embodiments, payment may be made using a digital or internet based currency. A customer, upon selecting such a currency may sign into an account using the kiosk's 100 interface 321 and/or the customer's client device 515, to arrange the completion of the payment via a payment processing server in communication with the kiosk 100, a third party payment processor and/or a banking computer system responsible for authorizing the payment transaction. A final receipt may be printed from the kiosk or digitally transmitted to the customer reflecting the status of the services as paid. The means for printing the final receipt may be made in any manner acceptable or as described above for providing the receipt comprising the scannable code 520 as described above.

In some embodiments, payment may be made via the client device 515 which may comprise an application capable of communicating via a wireless protocol such as Bluetooth, Wi-Fi, IR, RFID, NFC, etc. The client device 515 may be able to authorize the payment transaction via the remote connection. For example, in one embodiment, the client device may already include payment authorization information loaded thereon. As the client device 515 is waived in front of the kiosk 100, the payment information may be transmitted to the payment module 713, allowing for the payment to be made quickly and without manually entering the payment information on the kiosk 100.

Once the payments are processed, the payment module 713 may, in step 925, inform the key module 711 to release the key 320 (corresponding to the completed transaction) as described by the scanned code from step 917, from the key storage container 118. The key module 711 may command the initiation of a motor or other device responsible for opening the key storage container 118 to release the key 320. Subsequently, upon the initiation of the motor or other opening device, the storage container 118 may be opened, releasing the key 320 therefrom. In the exemplary embodiments, the key may fall from the inside of the key storage container 118 onto a series of ramped surfaces 120 or tracks positioned beneath the key storage container. In step 927, the released key 320 may be guided along the path of ramped surfaces 120 to the retrieval zone 114 of the kiosk. Once the key has been delivered, the customer may open the key retrieval zone 114 as shown in FIG. 6c and remove the key from the retrieval zone 114.

Computer System

Figure 10:
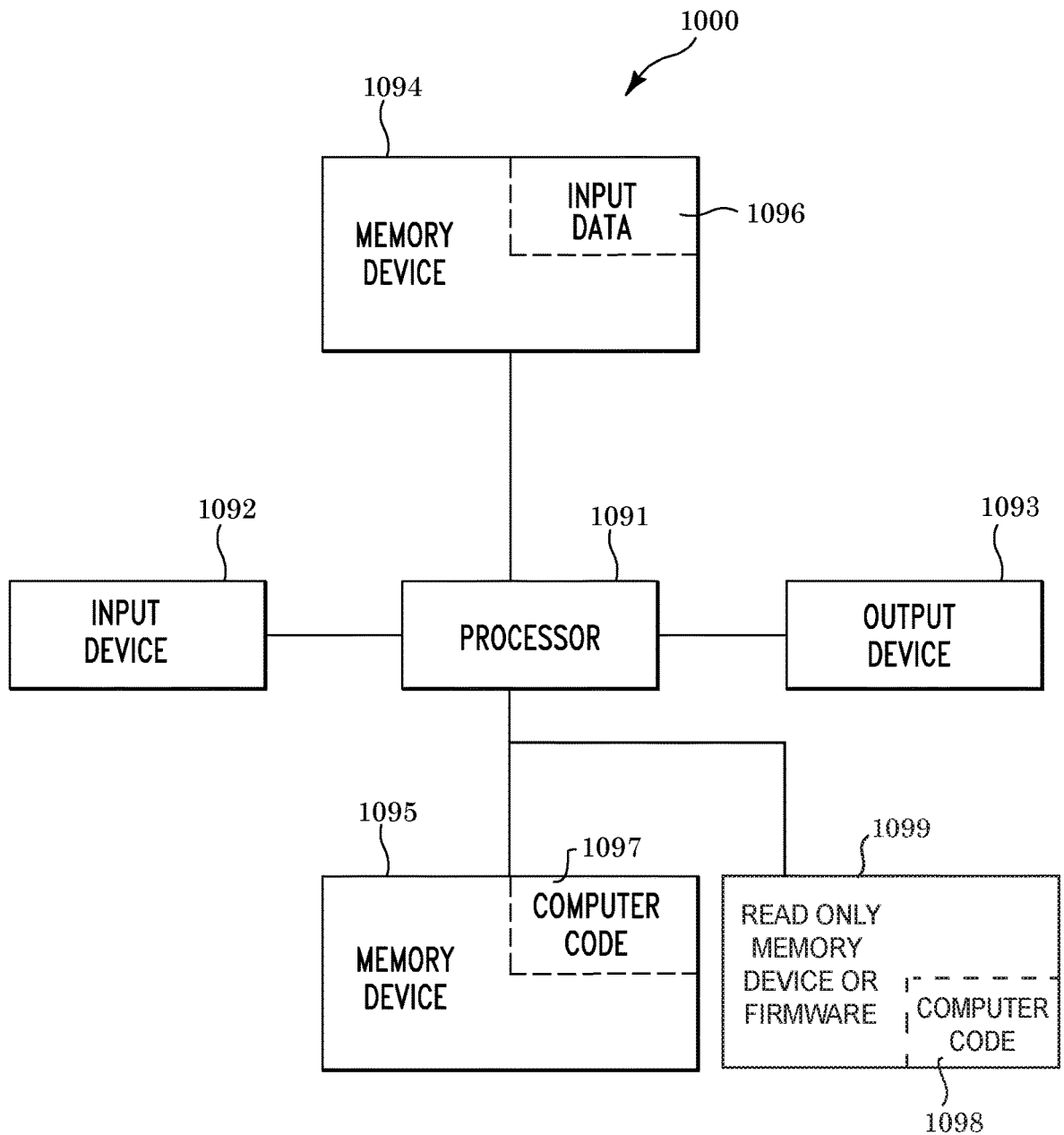
FIG. 10 depicts a block diagram of a computer system capable of implementing the methods for performing an automotive service, consistent with the disclosure of the present application.

Referring to the drawings, FIG. 10 illustrates a block diagram of a computer system 1000 that may be included in the systems of FIGS. 1-8 and for implementing methods for performing an automotive service transaction shown in FIG. 9, and in accordance with the embodiments described in the present disclosure. The computer system 1000 may generally comprise a processor 1091, otherwise referred to as a central processing unit (CPU), an input device 1092 coupled to the processor 1091, an output device 1093 coupled to the processor 1091, and memory devices 1094 and 1095 each coupled to the processor 1091. The input device 1092, output device 1093 and memory devices 1094, 1095 may each be coupled to the processor 1091 via a bus. Processor 1091 may perform computations and control the functions of computer 1000, including executing instructions included in the computer code 1097 for tools and programs implementing a method for performing an automotive service transaction in the manner prescribed by the embodiments of the disclosure using the systems of FIGS. 1-8, wherein the instructions of the computer code 1097 may be executed by processor 1091 via memory device 1095. The computer code 1097 may include software or program instructions that may implement one or more algorithms for implementing the methods for performing an automotive service transaction, as described in detail throughout this application. The processor 1091 executes the computer code 1097. Processor 1091 may include a single processing unit, or may be distributed across one or more processing units in one or more locations (e.g., on a client and server).

The memory device 1094 may include input data 1096. The input data 1096 includes any inputs required by the computer code 1097, 1098. The output device 1093 displays output from the computer code 1097, 1098. Either or both memory devices 1094 and 1095 may be used as a computer usable storage medium (or program storage device) having a computer readable program embodied therein and/or having other data stored therein, wherein the computer readable program comprises the computer code 1097, 1098. Generally, a computer program product (or, alternatively, an article of manufacture) of the computer system 1000 may comprise said computer usable storage medium (or said program storage device).

Memory devices 1094, 1095 include any known computer readable storage medium, including those described in detail below. In one embodiment, cache memory elements of memory devices 1094, 1095 may provide temporary storage of at least some program code (e.g., computer code 1097, 1098) in order to reduce the number of times code must be retrieved from bulk storage while instructions of the computer code 1097, 1098 are executed. Moreover, similar to processor 1091, memory devices 1094, 1095 may reside at a single physical location, including one or more types of data storage, or be distributed across a plurality of physical systems in various forms. Further, memory devices 1094, 1095 can include data distributed across, for example, a local area network (LAN) or a wide area network (WAN). Further, memory devices 1094, 1095 may include an operating system (not shown) and may include other systems not shown in the figures.

In some embodiments, rather than being stored and accessed from a hard drive, optical disc or other writeable, rewriteable, or removable hardware memory device 1094, 1095, stored computer program code 1098 (e.g., including algorithms) may be stored on a static, non-removable, read-only storage medium such as a Read-Only Memory (ROM) device 1099, or may be accessed by processor 1091 directly from such a static, non-removable, read-only medium 1099. Similarly, in some embodiments, stored computer program code 1097 may be stored as computer-readable firmware 1099, or may be accessed by processor 1091 directly from such firmware 1099, rather than from a more dynamic or removable hardware data-storage device 1095, such as a hard drive or optical disc.

In some embodiments, the computer system 1000 may further be coupled to an input/output (I/O) interface and a computer data storage unit (for example a data store, data mart or repository). An I/O interface may include any system for exchanging information to or from an input device 1092 or output device 1093. The input device 1092 may be, inter alia, a keyboard, joystick, trackball, touchpad, mouse, sensors, beacons, RFID tags, microphones, biometric input device, camera, timer, etc. The output device 1093 may be, inter alia, a printer, a plotter, a display device (such as a computer screen or monitor), a magnetic tape, a removable hard disk, a floppy disk, etc. The memory devices 1094 and 1095 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 1000, and may include any type of transmission link, including electrical, optical, wireless, etc.

The I/O interface may allow computer system 1000 to store information (e.g., data or program instructions such as program code 1097, 1098) on and retrieve the information from a computer data storage unit (not shown). Computer data storage units include any known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk).

As will be appreciated by one skilled in the art, in a first embodiment, the present invention may be a system; in a second embodiment, the present invention may be a method; and in a third embodiment, the present invention may be a computer program product. Any of the components of the embodiments of the present invention can be deployed, managed, serviced, etc. by a service provider able to deploy or integrate computing infrastructure with respect to performing an automotive service transaction. Thus, an embodiment of the present invention discloses a process for supporting computer infrastructure, where the process includes providing at least one support service for at least one of integrating, hosting, maintaining and deploying computer-readable code (e.g., program code 1097, 1098) in a computer system (e.g., computer 1000) including one or more processor(s) 1091, wherein the processor(s) carry out instructions contained in the computer code 1097 causing the computer system to perform an automotive service transaction. Another embodiment discloses a process for supporting computer infrastructure, where the process includes integrating computer-readable program code into a computer system including a processor.

The step of integrating includes storing the program code in a computer-readable storage device of the computer system through use of the processor. The program code, upon being executed by the processor, implements a method for performing an automotive service transaction. Thus the present invention discloses a process for supporting, deploying and/or integrating computer infrastructure, integrating, hosting, maintaining, and deploying computer-readable code into the computer system 1000, wherein the code in combination with the computer system 1000 is capable of performing a method of performing an automotive service transaction.

A computer program product of the present invention comprises one or more computer readable hardware storage devices having computer readable program code stored therein, said program code containing instructions executable by one or more processors of a computer system to implement the methods of the present invention.

A computer program product of the present invention comprises one or more computer readable hardware storage devices having computer readable program code stored therein, said program code containing instructions executable by one or more processors of a computer system to implement the methods of the present invention.

A computer system of the present invention comprises one or more processors, one or more memories, and one or more computer readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A kiosk system comprising:
   a processor;
   a memory device coupled to the processor;
   a scanning device in electronic communication with the processor;
   a key storage system within an exterior surface in electronic communication with the processor, comprising a deposit zone, the deposit zone comprising a first lockable bin, the lockable bin adapted to rotate forward from the exterior surface, and a retrieval zone, the retrieval zone comprising a second lockable bin adapted to rotate forward or slide outward from the exterior surface, wherein the deposit zone is separate from the retrieval zone; and
   a computer readable storage device coupled to the processor, wherein the storage device contains program code executable by the processor via the memory device to implement a method for performing a service transaction comprising the steps of:
      receiving, by the processor, user input identifying a user profile;
      displaying, by the processor, a plurality of services available for each vehicle registered to the user profile;
      scheduling, by the processor, a selected service;
      assigning, by the processor, a storage location for a key deposited into the deposit zone of the key storage system; and
      providing, by the processor, a scannable code, wherein the scannable code identifies the storage location of the key and instructs the computer system to retrieve the key as a function of scanning the scannable code with the scanning device.

2. The kiosk system of claim 1, wherein the user input identifying the user profile is received by the processor as a function of scanning, with the scanning device, a driver's license.

3. The kiosk system of claim 1, further comprising a payment system electronically connected to the processor of the computer system, wherein the program code executable by the processor further comprises the steps of:
   receiving, by the processor, instructions as a function of scanning the scannable code, identifying the storage location of the key previously deposited in the deposit zone;
   further receiving, by the processor, payment information inputted into the payment system;
   retrieving, by the processor, the key from the storage location; and delivering the key to the retrieval zone of the computer system.

4. The kiosk system of claim 3, wherein the program code executable by the processor further comprises the steps of:
   delivering, by the processor, a receipt, wherein the receipt is electronically transmitted to a separate client device or printed by the computer system.

5. The kiosk system of claim 4, wherein the step of electronically transmitting the receipt to the separate client device is delivered using a method selected from the group consisting of email, push notification, short messaging service (SMS) and direct messaging.

6. The kiosk system of claim 3, wherein the step of providing the scannable code further comprises:

transmitting, by the processor, the scannable code to a mobile application server responsible for serving the scannable code to a client device.

7. The kiosk system of claim 1, wherein the computer system is a kiosk.

8. The kiosk system of claim 1 further comprising a payment system, the payment system comprising a card reader and a pin pad.

9. The kiosk system of claim 8, wherein the card reader is adapted to read data from credit cards and debit cards.

10. The kiosk system of claim 1, wherein the key storage system comprises a plurality of key storage containers.

\* \* \* \* \*